(12) United States Patent
Degura

(10) Patent No.: US 6,178,024 B1
(45) Date of Patent: *Jan. 23, 2001

(54) OPTICAL SPACE COMMUNICATION APPARATUS

(75) Inventor: Yasusaburo Degura, Urawa (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/617,123

(22) Filed: Mar. 18, 1996

(30) Foreign Application Priority Data

Mar. 22, 1995 (JP) .................................... 7-090338

(51) Int. Cl.⁷ .................................................. H04B 10/00
(52) U.S. Cl. ............................ 359/159; 359/115; 359/172
(58) Field of Search ..................... 359/115, 143, 359/152–153, 159, 168–170, 172

(56) References Cited

U.S. PATENT DOCUMENTS

| | | | |
|---|---|---|---|
| 4,867,560 | * 9/1989 | Kunitsugu | 359/159 |
| 5,142,400 | * 8/1992 | Solinsky | 359/152 |
| 5,594,580 | * 1/1997 | Sakanaka et al. | 359/159 |
| 5,684,614 | * 11/1997 | Degura | 359/172 |

FOREIGN PATENT DOCUMENTS 59-126341   7/1994   (JP) .

* cited by examiner

Primary Examiner—Kinfe-Michael Negash
(74) Attorney, Agent, or Firm—Fitzpatrick, Cella, Harper & Scinto

(57) ABSTRACT

An optical space communication apparatus for performing communication by propagating a light beam in a free space includes a multiplexing device for multiplexing a first pilot signal with a transmission signal, a first converting device for converting a first electric signal from the multiplexing device into a first light signal, a transmitting optical system for transmitting the first light signal to a party apparatus, a receiving optical system for receiving a second light signal containing a second pilot signal, having been transmitted from the party apparatus, a second converting device for converting the second light signal into a second electric signal, an adjusting device for adjusting an angle of the receiving optical system, and a control device for controlling the adjusting device. The apparatus is further provided with an excessive light stopping device for stopping excessive light from entering the second converting device, wherein the excessive light stopping device is arranged also to serve as the adjusting device.

3 Claims, 7 Drawing Sheets

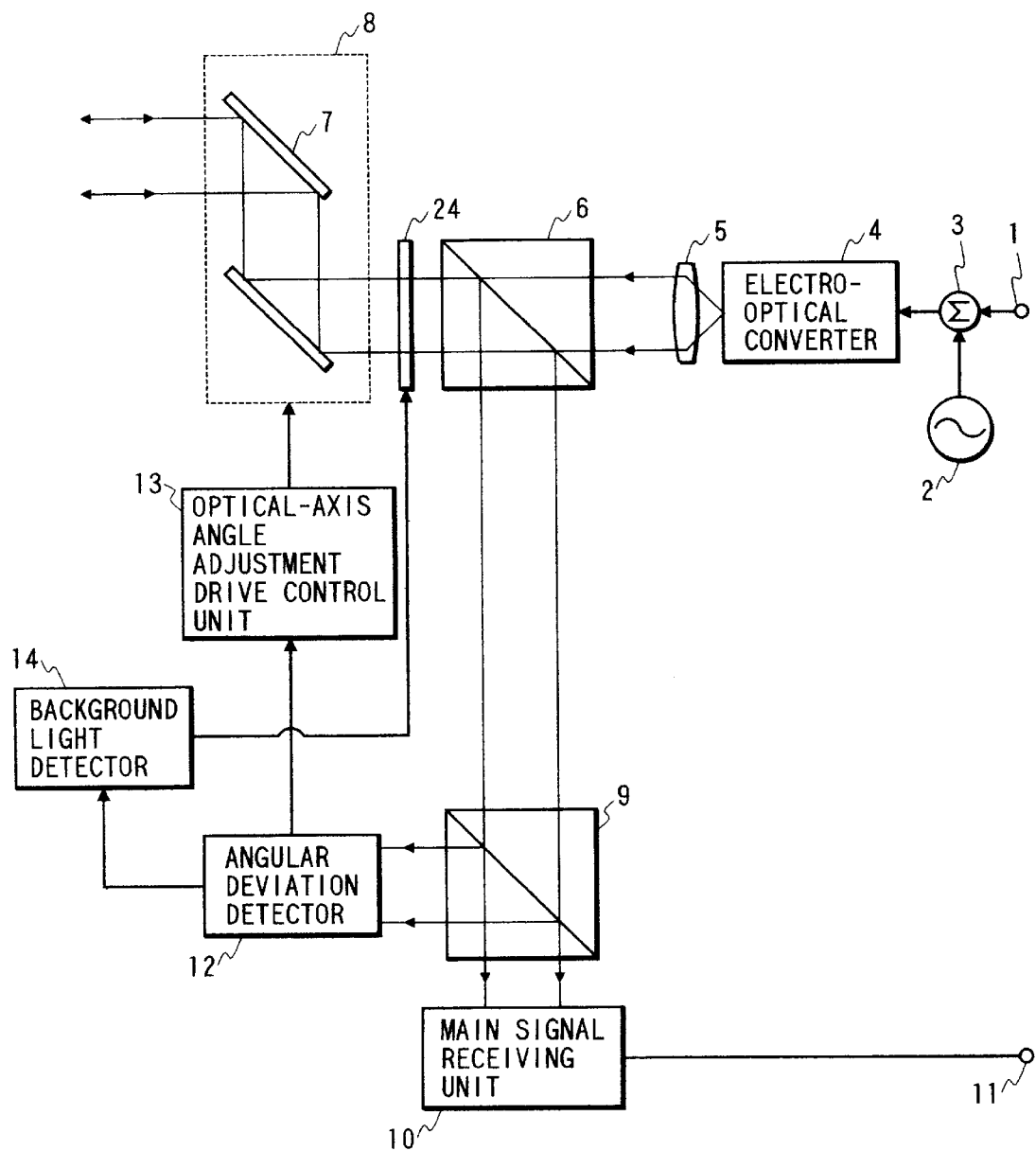

OPTICAL SPACE COMMUNICATION APPARATUS

BACKGROUND OF THE INVENTION

1. Field of the Invention

The present invention relates to a two-way optical space communication apparatus provided with a function to adjust an angle of transmitting light or receiving light, which performs two-way (bidirectional) information transmission by propagating a light signal in a beam shape in a free space.

2. Related Background Art

In conventional optical space communication apparatus, a transmission-side device transmits a signal in which a pilot signal is superimposed on a main signal (transmission signal), and a reception-side device detects the pilot signal to detect an angular deviation between the optical axis of a receiving optical system and an arrival direction of the receiving light, thereby adjusting the angle upon start of operation or correcting the angle during operation. The pilot signal is a signal having a frequency band different from and narrower than that of the main signal. An example of the pilot signal is a sinusoidal signal.

A generally employed method for detecting the angular deviation is one arranged in such a manner that a receiving light spot focused by the receiving optical system is guided onto a photodetector and the photodetector detects a position of the spot. The photodetector employed is a PSD (Position Sensitive Detector) or a CCD (Charge Coupled Device), which demonstrates weakness with respect to the response speed when the frequency of the pilot signal is high. For overcoming it, generally employed is a method using an array of plural photodetectors comprised of photodiodes with fast response speed and detecting differences of outputs from the photodiodes, in which the photodetectors with same characteristics are located in the four quadrants and the position of the receiving light spot is obtained from a sum and a difference between the outputs from the photodetectors.

The reason why the pilot signal is used is that high-sensitive reception is possible because of its narrower band than that of the main signal and that the control function can be maintained even if the main signal becomes weak or even if there is no input of the main signal. Further, influence of background light can be decreased when the angular deviation is detected with the pilot signal having a certain high frequency component, different from low frequency components such as dc light.

The background light is all light other than the light transmitted from the transmission-side device, in the light entering the reception-side device. For example, the background light includes sunlight, lights of buildings, etc.

However, when the background light greatly increases, for example if the direct rays of the sun are incident on the light receiving elements for detecting the main signal and angular deviation signal, these light receiving elements could be damaged in the worst case. There is another problem that the angular deviation detector fails to discriminate the desired receiving light from the background light so as to erroneously correct the angle with respect to the arrival direction of the background light, which results in failing to recognizing the arrival direction of the desired receiving light even after the background light decreased, thereby failing to returning to the normal communication condition.

SUMMARY OF THE INVENTION

An object of the present invention is to provide an optical space communication apparatus which is arranged to prevent damage on the light receiving elements and erroneous operation of the angle correcting function due to the background light, as overcoming the above problems.

In order to achieve the above object, the present invention provides an optical space communication apparatus for performing communication by propagating a light beam in a free space, comprising:

multiplexing means for multiplexing a first pilot signal with a transmission signal;

first converting means for converting a first electric signal from the multiplexing means into a first light signal;

a transmitting optical system for transmitting the first light signal to a party apparatus;

a receiving optical system for receiving a second light signal containing a second pilot signal, having been transmitted from the party apparatus;

second converting means for converting the second light signal into a second electric signal;

adjusting means for adjusting an angle of the receiving optical system;

control means for controlling the adjusting means; and excessive light stopping means for stopping excessive light from entering the second converting means, wherein the excessive light stopping means is arranged also to serve as the adjusting means.

In order to achieve the above object, the present invention further provides a two-way optical space communication apparatus, which is provided with a function to adjust an angle of a receiving optical system so as to keep the optical axis of a transmitting optical system aligned with the optical axis of the receiving optical system and which performs two-way information transmission with light signals between apparatus opposed to each other at a predetermined distance, the optical space communication apparatus comprising generating means for generating a first pilot signal in a sinusoidal form, multiplexing means for multiplexing the first pilot signal with a transmission signal, electro-optical converting means for converting a first electric signal from the multiplexing means into a first light signal, a transmitting optical system for transmitting the first light signal to a party apparatus, a receiving optical system for receiving a second light signal containing a second pilot signal, having been transmitted from the opposed party apparatus in order to detect an angular deviation between the receiving optical system and an arrival direction of the receiving light, a plurality of photo-electrical converting means for receiving the second light signal and converting the second light signal into a second electric signal, angular deviation correcting means for correcting the angular deviation, excessive light detecting means for detecting input of excessive light due to the background light or the like, and excessive light stopping means for stopping the excessive light from entering the photo-electrical converting means, wherein the excessive light stopping means is arranged also to serve as the angular deviation correcting means.

In the optical space communication apparatus having the above configuration, the multiplexing means multiplexes the first pilot signal of sinusoidal wave from the generating means with the main signal of the transmission signal, the electro-optical converting means converts this electric signal into a light signal, and the transmitting optical system transmits the light signal to the party apparatus located as opposed at the predetermined distance from the transmitting optical system. The plurality of photo-electrical converting means receive the light signal from the party apparatus in order to detect the angular deviation between the arrival direction of the receiving light from the party apparatus and the optical axis of the receiving optical system, the angular deviation correcting means corrects the angular deviation, and at the same time, the background light detecting means detects input of excessive light due to the background light, thereby stopping the excessive light from entering the photoelectrical converting means.

BRIEF DESCRIPTION OF THE DRAWINGS

FIG. 7 is a structural drawing of the third embodiment.

DESCRIPTION OF THE PREFERRED EMBODIMENTS

The optical space communication apparatus of the present invention will be explained in detail based on the embodiments illustrated.

Figure 1:
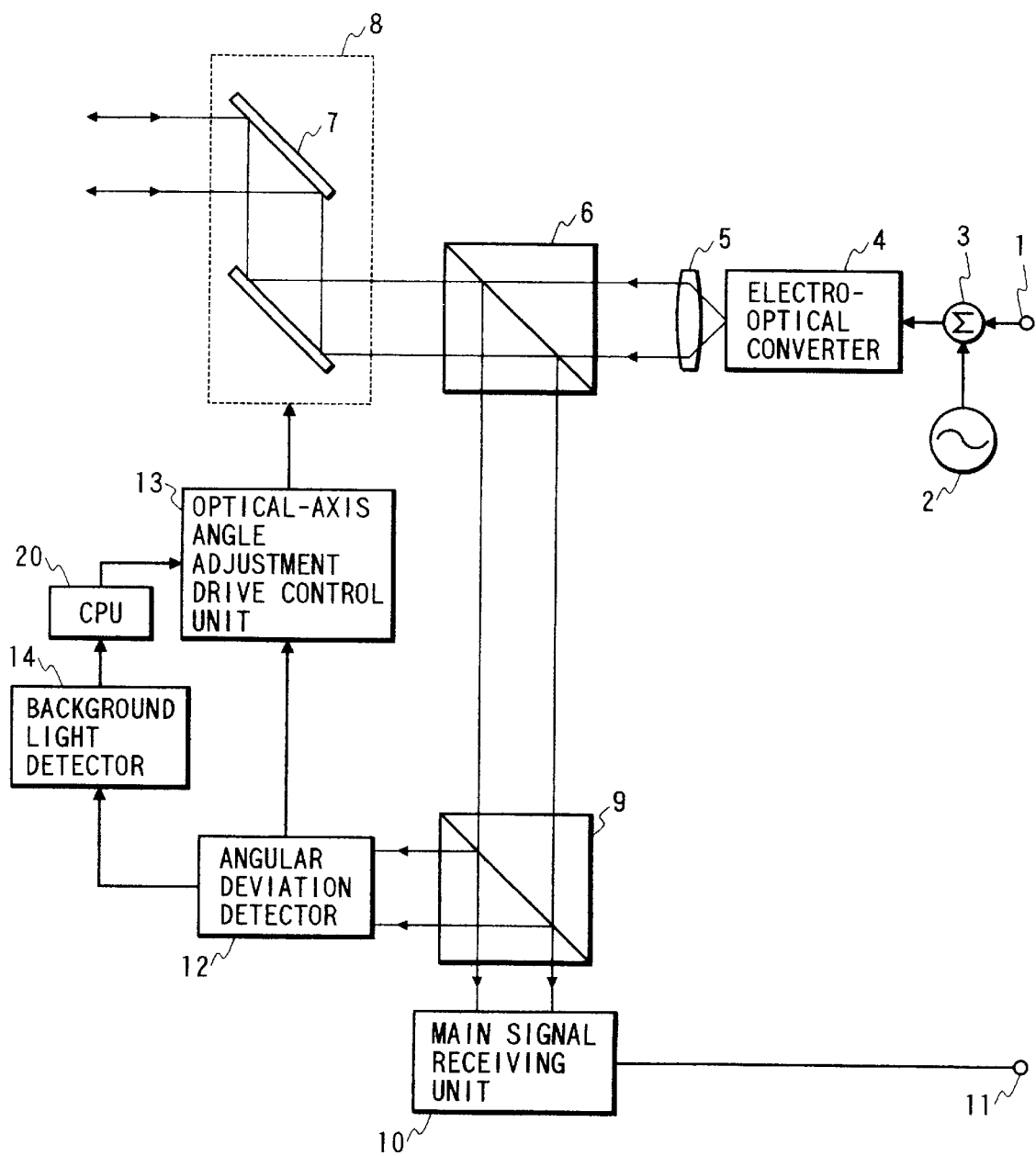
FIG. 1 is a structural drawing of the optical space communication apparatus of the first embodiment of the present invention.

FIG. 1 is a structural drawing of the first embodiment, in which the output of a transmission signal input portion 1, which is a portion for input of a transmission signal to be transmitted to the party apparatus opposed, and the output of a pilot signal generator 2, which generates a pilot signal of sinusoidal wave for detecting the angular deviation between the optical axis of the receiving optical system and the arrival direction of receiving light in the party apparatus opposed, are connected to a multiplexer 3 for multiplexing the pilot signal with the transmission signal and in which the output (the first electric signal) of the multiplexer 3 is connected to an electro-optical converter 4 for converting an electric signal into a light signal. On the optical path ahead of the electro-optical converter 4, there are a lens system 5, a first beam splitter 6, and an optical-axis angle adjustment drive mechanism 8 having an optical mirror system 7 for correcting the angular deviation of the optical axis, arranged in order.

On the optical path extending on the reflection side of the first beam splitter 6, there are a second beam splitter 9 and a main signal receiver 10 incorporating a photo-electrical converter, arranged in position and the output of the main signal receiver 10 is connected to a reception signal outputting portion 11. On the reflection side of the second beam splitter 9 an angular deviation detector 12 is placed for detecting the angular deviation between the optical axis of the receiving optical system and the arrival direction of the receiving light, and the output of the angular deviation detector 12 is connected to an optical-axis angle adjustment drive control unit 13 for controlling the optical mirror system 7 of the optical-axis angle adjustment drive mechanism 8 in order to correct the angular deviation. The output of the angular deviation detector 12 is also connected to a background light detector 14 for detecting the level of the background light incident to the angular deviation detector 12 as multiplexed in the receiving light, and the output of the background light detector 14 is also connected through CPU 20 to the optical-axis angle adjustment drive control unit 13.

Figure 2:
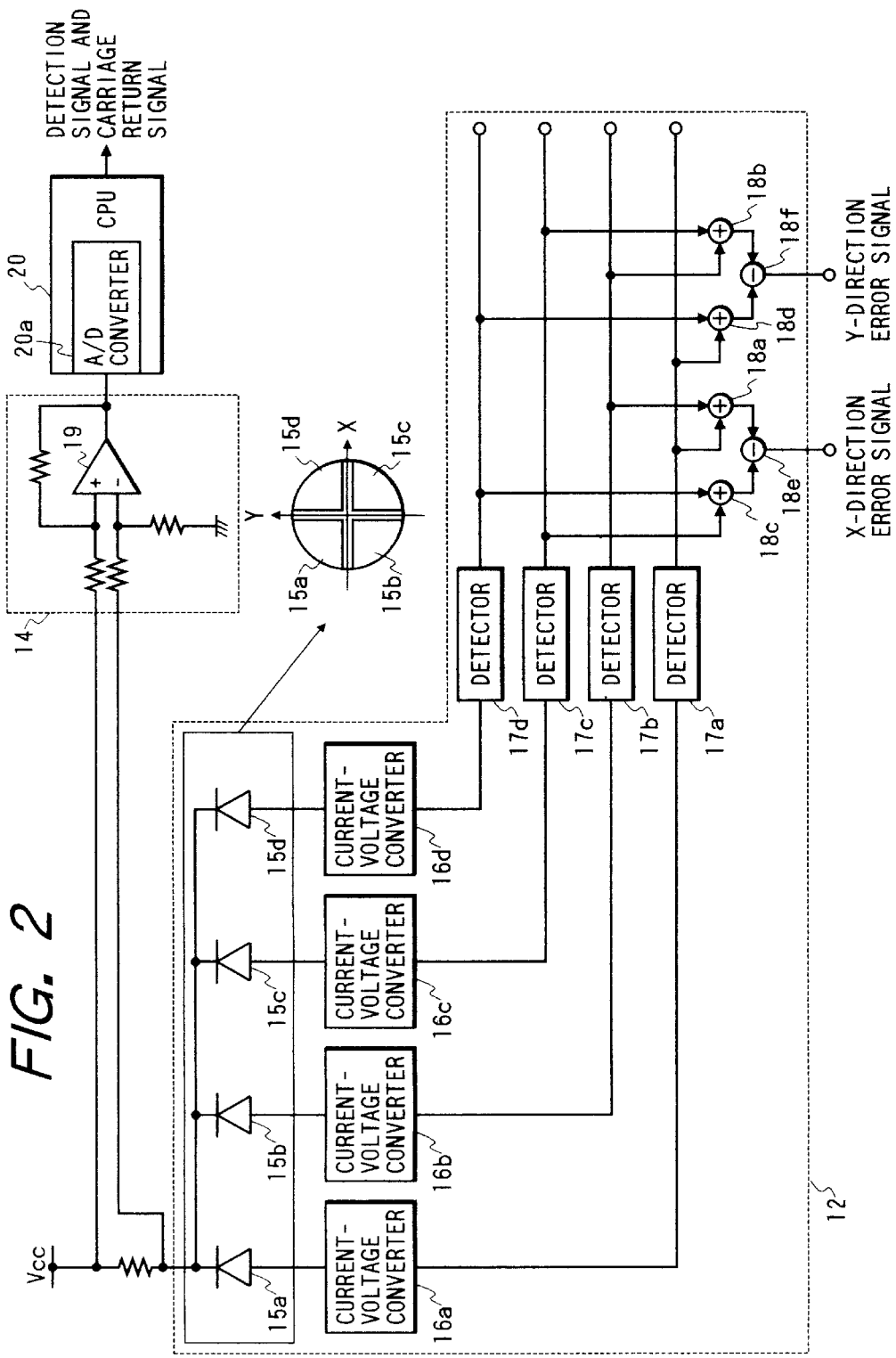
FIG. 2 is a circuit diagram of an angular deviation detector and a background light detector.

FIG. 2 is a circuit diagram of the angular deviation detector 12 and background light detector 14, in which the angular deviation detector 12 has four segmental photodetector elements 15a–15d for converting the light signal transmitted from the party apparatus and converting it into electric current signals and in which these photodetector elements 15a–15d are used both as angular deviation detecting elements and as background light detecting elements. The outputs of the photodetector elements 15a–15d each are connected through respective current-voltage converters 16a–16d to detectors 17a–17d, and further, the outputs of the detectors 17a–17d each are connected to arithmetic circuits 18a–18f, thereby forming the angular deviation detector 12 and generating signals about X-directional and Y-directional angular deviations.

Further, the outputs of the photodetector elements 15a–15d are connected to the background light detector 14 composed of an operational amplifier 19 and resistors, and the output of the background light detector 14 is connected to the CPU 20 incorporating an A/D converter 20a, which compares the output with a voltage value preliminarily set to generate a detection signal and a return signal.

The main signal, which is the transmission signal from the transmission signal input portion 1, is multiplexed with the first pilot signal from the pilot signal generator 2 in the multiplexer 3, the resultant signal is converted into a first light signal (first light beam) in the electro-optical converter 4, and thereafter the first light signal travels through the lens system 5 and first beam splitter 6 and via the optical mirror system 7 in the optical-axis angle adjustment drive mechanism 8 for correcting the angular deviation of the optical axis to be transmitted toward the opposed party apparatus.

A second light signal (second light beam) containing the second pilot signal, having been transmitted from the party apparatus, is reflected by the optical mirror system 7 in the optical-axis angle adjustment drive mechanism 8, and by the first beam splitter 6 to be guided to the second beam splitter 9 and thereby to be branched to the main signal receiver 10 and to the angular deviation detector 12. The main signal passing through the second beam splitter 9 is received by the main signal receiver 10 to be photoelectrically converted and thereby to be output as a reception signal through the reception signal output portion 11.

On the other hand, the second pilot signal having been transmitted from the party apparatus and reflected by the second beam splitter 9 is received by the four photodetector elements 15a–15d in the angular deviation detector 12 to be photoelectrically converted into electric current signals, the electric current signals are converted into voltage signals (the second electric signal) in the associated current-voltage converters 16a–16d, the voltage signals are detected by the corresponding detectors 17a–17d, and the signals detected are subjected to arithmetics by the arithmetic circuits 18a–18f to generate X-directional and Y-directional error signals. The angular deviation between the optical axis of the receiving optical system and the arrival direction of the receiving light is measured from these signals, and, based on this information, the optical-axis angle adjustment drive control unit 13 corrects the angular deviation by driving the optical mirror system 7 in the optical-axis angle adjustment drive mechanism 8.

The signals received by the photodetector elements 15a–15d are also used for detection of the background light in the background light detector 14. This is because a directional angle of the photodetector elements 15a–15d is generally set wider than that of the detecting element of the main signal receiver 10. If a light receiving element used only for detection of the background light is employed, the directional angle thereof should be set equal to or more than that of the photodetector elements 15a–15d.

Since the receiving light received by the photodetector elements 15a–15d in the angular deviation detector 12 includes the background light multiplexed therein, the background light detector 14 detects the background light and compares it with a reference level preliminarily set in the CPU 20. When the background light detected is determined to be of an excessive level, the CPU 20 generates an excessive light detection signal to change the direction of the optical mirror system 7 in the optical-axis angle adjustment drive mechanism 8, thereby stopping the excessive background light from continuing entering the photodetector elements 15a–15d. Then the CPU 20 generates a return signal after a lapse of a predetermined time from generation of the excessive light detection signal to return the direction of the optical mirror system 7 in the optical-axis angle adjustment drive mechanism 8 to the original state, thereby establishing the normal communication condition.

Figure 3:
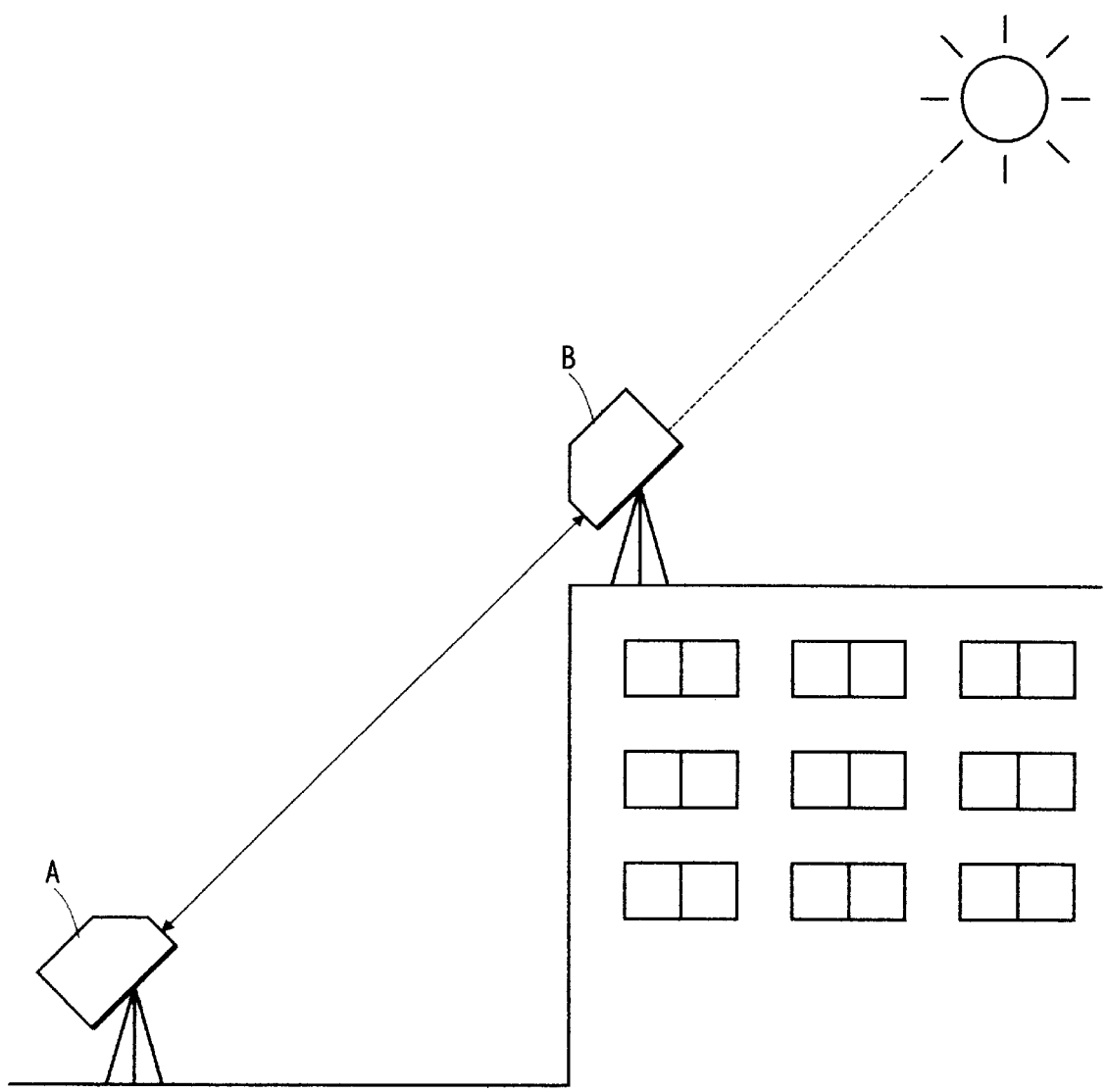
FIG. 3 is an explanatory drawing to show the placement of the apparatus upon communication with light signals.

FIG. 3 is an explanatory drawing to show the placement of the apparatus upon communication with light signals, in which an apparatus A on the ground is opposed to another apparatus B on the roof of a high-rise building and in which two-way information transmission is carried out with light signals. Supposing the sun is located on the optical axis between the apparatus A and the apparatus B at a certain time, the direct rays of the sun are incident to the apparatus A to be condensed on the receiving element of the main signal receiver 10 and on the photodetector elements 15a–15d of the angular deviation detector 12. If this state continues, these photodetector elements could be damaged or be destroyed in the worst case.

In such cases, the background light is detected in the apparatus A, and the direction of the optical mirror system 7 in the optical-axis angle adjustment drive mechanism 8 is changed so as to once disable information transmission, thereby preventing the damage on the photodetector elements and the erroneous operation of the angular correcting function. After waiting for a predetermined period, the optical mirror system 7 in the optical-axis angle adjustment drive mechanism 8 is returned to the original state, thereby again establishing the normal communication condition.

Figure 4:
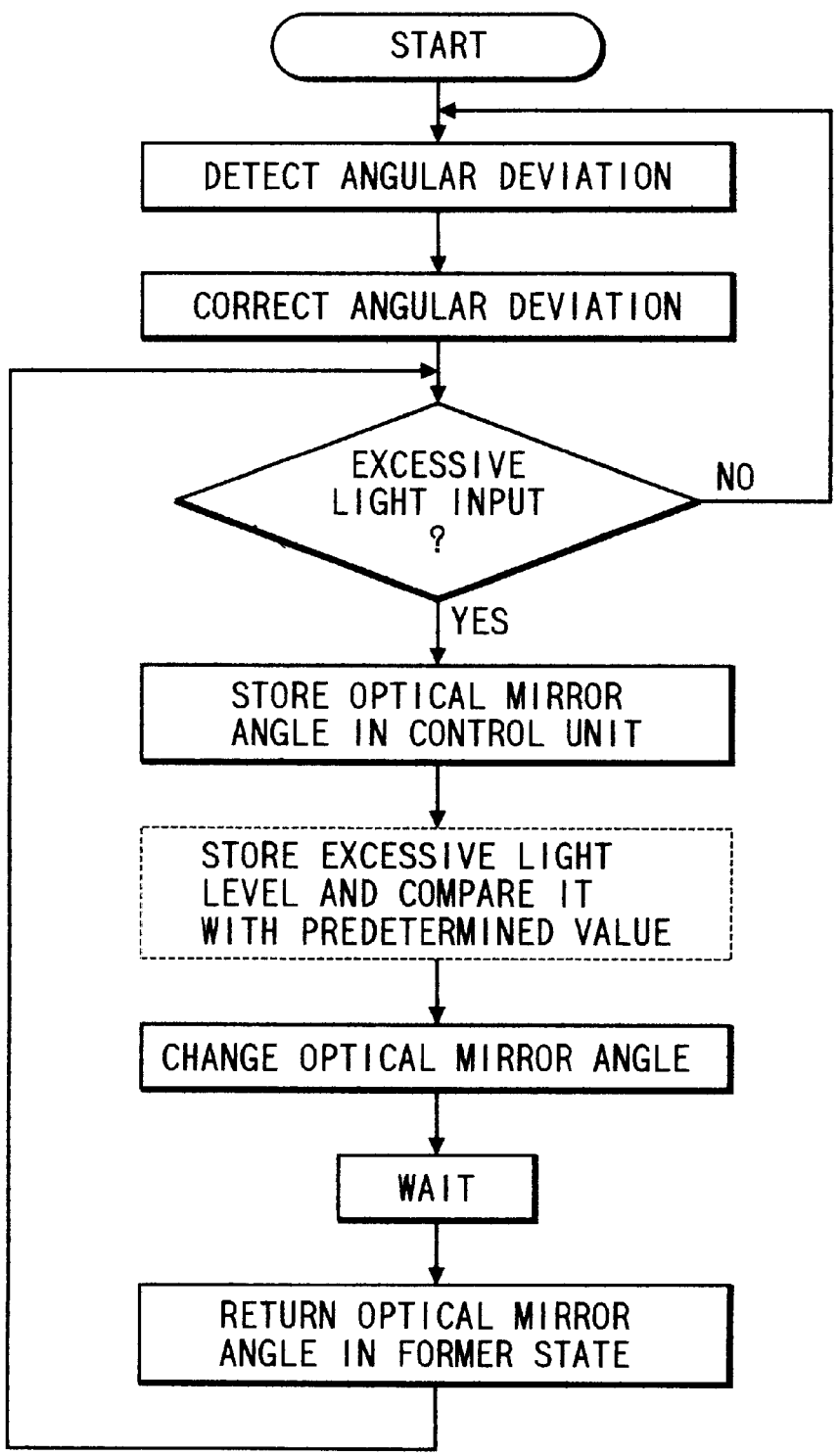
FIG. 4 is a flowchart.

FIG. 4 is a flowchart of the above operation, in which the waiting period may be set constant, but the waiting period may be arranged to change depending upon the level of the excessive light, for example, based on a result at the step encircled in the dotted line to store the level of the excessive light and compare it with a predetermined value, which can efficiently return the apparatus to the communication condition within a shorter period.

Figure 5:
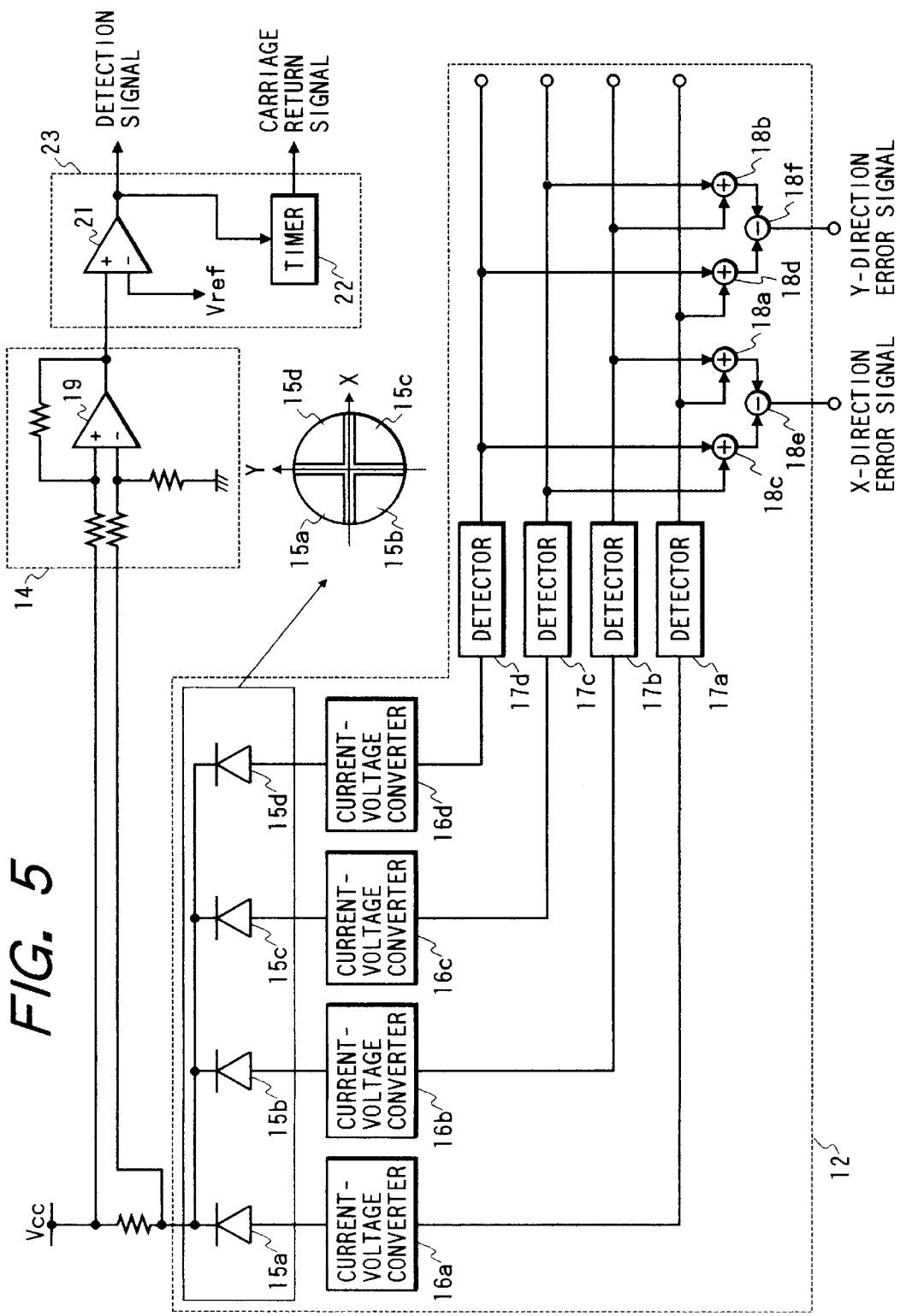
FIG. 5 is a circuit diagram of another angular deviation detector and background light detector.

FIG. 5 shows a modification of a simpler configuration using an instruction signal generator 23 composed of a comparator 21 and a timer 22 instead of the CPU 20, in which the comparator 21 in the instruction signal generator 23 compares a signal from the background light detector 14 with a reference signal Vref to output an excessive light detection signal if the background light is of the excessive light level, and to generate a return signal by the timer 22 after a lapse of the predetermined period.

Figure 6:
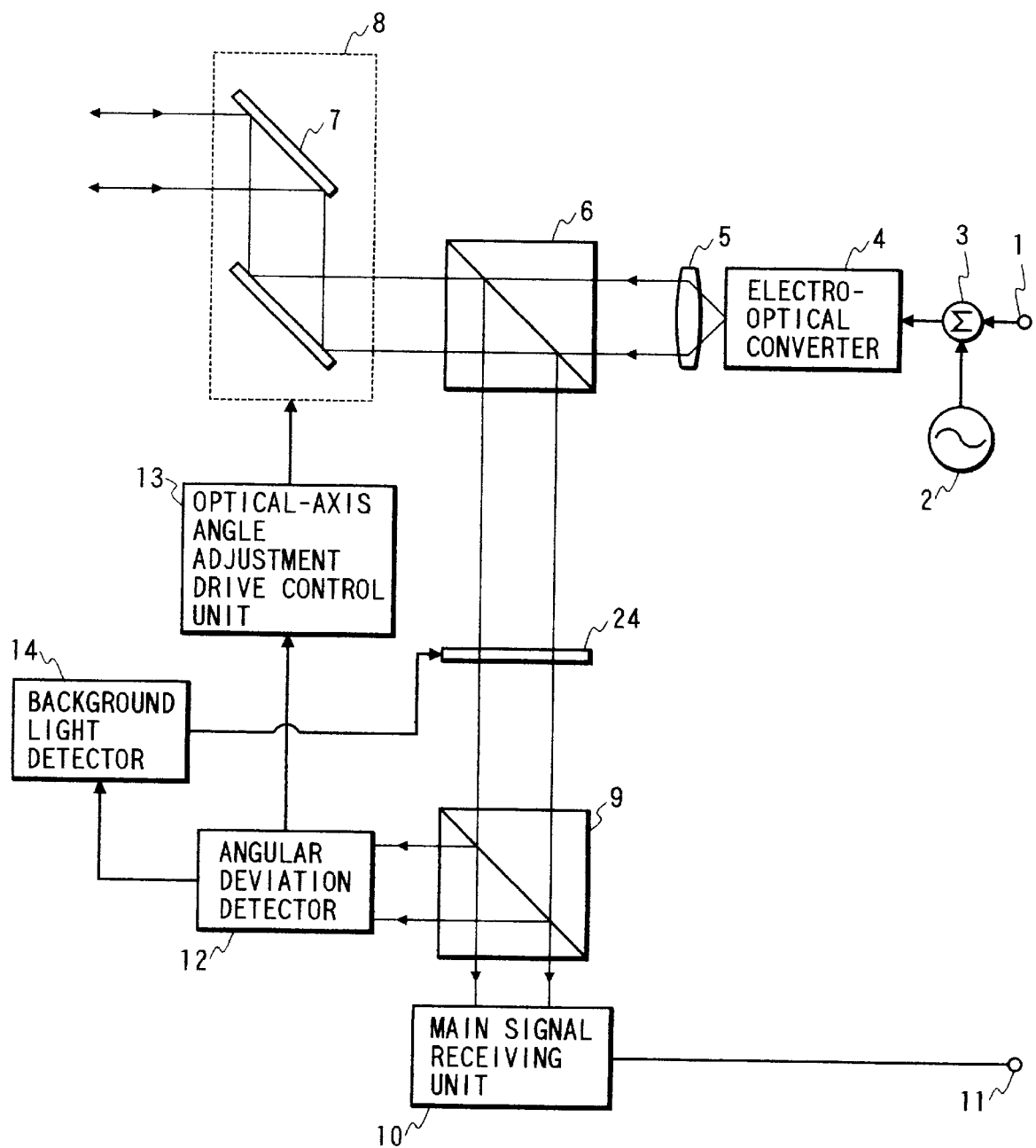
FIG. 6 is a structural drawing of the second embodiment.

FIG. 6 shows the second embodiment, in which the same reference numerals as those in FIG. 1 denote the same members. Disposed between the first and second beam splitters 6, 9 is a mechanical element 24 such as a mechanical shutter for mechanically interrupting the optical path or a shutter 24 such as a liquid crystal shutter for electrically changing the transmittance, actuated by the output from the background light detector 14.

FIG. 7 shows the third embodiment, in which the shutter 24 is positioned between the first beam splitter 6 and the optical-axis angle adjustment drive mechanism 8.

When the background light is determined to be of the excessive level in these second and third embodiments, the shutter 24 is actuated to stop the background light from entering the light receiving element of the main signal receiver 10 and the photodetector elements 15a–15d of the angular deviation detector 12 and the shutter 24 is opened by the return signal after a lapse of the predetermined period, thereby returning to the normal communication condition.

As explained above, the optical space communication apparatus of the present invention is arranged in such a manner that the transmission signal is multiplexed with the pilot signal in the multiplexer 3 and the signal thus obtained is transmitted via the optical-axis angle adjustment drive mechanism 8 to the party apparatus. Out of the receiving light transmitted from the party apparatus, the main signal is received by the main signal receiver 10 via the optical-axis angle adjustment drive mechanism 8, the first beam splitter 6, and the second beam splitter 9. On the other hand, the receiving light with the background light multiplexed therein is received by the angular deviation detector 12. If the background light is determined to be of the excessive light level, the optical-axis angle adjustment drive control unit 13 drives the optical-axis angle adjustment drive mechanism 8 to change the direction of the mirror system 7 so as to stop the excessive light from entering the light receiving elements of the main signal receiver 10 and angular deviation detector 12, and returns the mechanism again to the normal communication condition after a lapse of the predetermined period.

As detailed above, the optical space communication apparatus according to the present invention is arranged to detect the excessive light of the background light or the like and to stop the excessive light from entering the light receiving elements, whereby it can prevent the damage on the light receiving elements and the erroneous operation of the angular correcting function due to the excessive light.

What is claimed is:

1. An optical space communication apparatus for performing communication by propagating a light beam in a free space, comprising:

multiplexing means for multiplexing a first pilot signal with a transmission signal;

first converting means for converting a first electric signal from said multiplexing means into a first light signal;

a transmitting optical system for transmitting the first light signal to a party apparatus;

a receiving optical system for receiving a second light signal containing a second pilot signal transmitted from the party apparatus;

second converting means for converting the second light signal into a second electric signal;

an optical mirror for guiding the second light signal to said second converting means;

adjusting means for adjusting a direction of said optical mirror; and control means for controlling said adjusting means, said control means stopping the second light signal from entering said second converting means and preventing communication of information by the first light signal and the second light signal when excessive light is detected and then re-establishing communication of information after a lapse of a predetermined time.

2. An optical space communication apparatus for performing communication by propagating a light beam in a free space, comprising:

a transmitting optical system for transmitting a first light signal to a party apparatus;

a receiving optical system for receiving a second light signal transmitted from the party apparatus;

converting means for converting the second light signal into an electric signal;

an optical mirror for guiding the second light signal to said converting means;

adjusting means for adjusting a direction of said optical mirror; and control means for controlling said adjusting means, said control means stopping the second light signal from entering said converting means and preventing communication of information by the first light signal and the second light signal when excessive light is detected and subsequently re-establishing communication of information after a lapse of a predetermined time.

3. A method for adjusting a direction of incidence of a light beam in an optical space communication system for performing communication by propagating a light beam in a free space, said method comprising the steps of:

receiving, with a light receiving element, a light signal converted into a light beam transmitted from a party-side optical space communication apparatus;

adjusting a direction of incidence of the light beam with an optical mirror when said receiving step is carried out;

stopping excessive light from entering said light receiving element by changing a direction of the optical mirror thereby preventing communication of information by the light beam; and re-establishing communication of information after continuation of the stopping step for a predetermined time.

* * * * *